United States Patent Office 3,282,965
Patented Nov. 1, 1966

3,282,965
ETHYL MALONATES DISUBSTITUTED BY AT LEAST ONE CYCLIC RADICAL
Etienne Szarvasi, Lyon, and Liliane Neuvy, Paris, France, assignors to Lipha, Lyonnaise Industrielle Pharmaceutique
No Drawing. Original application Feb. 21, 1962, Ser. No. 174,684, now Patent No. 3,257,420, dated June 21, 1966. Divided and this application Sept. 3, 1965, Ser. No. 485,092
Claims priority, application France, Feb. 23, 1961, 853,642, Patent 1,289,597
5 Claims. (Cl. 260—347.4)

This invention relates to α-substituted carboxylic acid derivatives and their production.

This application is a divisional application of application Serial 174,684, filed February 21, 1962, now U.S. Patent No. 3,257,420, issued June 21, 1966.

The compounds with which the invention is concerned are the disubstituted ethyl malonates represented by the general formula

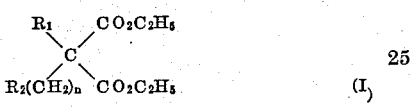

(I)

wherein $n$ is an odd number at most equal to 3,
$R_1$ is the naphthyl methyl radical, and
$R_2$ is a member of the group consisting of the furyl and tetrahydrofuryl radicals.

The above disubstituted alkyl malonates are preferably obtained by reaction of a sodium alcoholate with an alkyl malonate mono-substituted by one of the radicals $R_1$ and $R_2 (CH_2)_n$ followed by condensation of the sodium derivative obtained with the halide of formula $R_2 (CH_2)_n X$ or $R_1 X$, in which X denotes chlorine or bromine, depending upon whether the radical already attached to the alkyl malonate is $R_1$ or $R_2(CH_2)_n$.

The disubstituted alkyl malonates of the formula

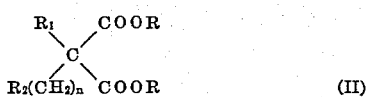

(II)

wherein $n$, $R_1$ and $R_2$ have the same meanings as before and R is a lower alkyl radical are of use as intermediates in the preparation of the α-substituted carboxylic acids and esters described and claimed in copending application 174,684, filed February 21, 1962. These acids may be prepared by the following method which comprises the saponification and decarboxylation of a disubstituted alkyl malonate of the Formula II by means of an alkali in the presence of an alcohol, preferably benzyl alcohol.

The following examples, illustrate the invention

EXAMPLE 1

Ethyl α-(1-naphthylmethyl) α-furfurylmalonate

Empirical formula $C_{23}H_{24}O_5$ (M=380.42) Molecular mass

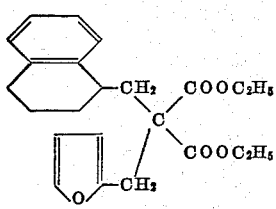

Sodium ethoxide is prepared by introducing 9 g. (0.4 atom) of sodium into 256 cc. of absolute ethanol. There are added thereto 96 g. (0.4 mol) of ethyl furfurylmalonate, and the mixture is boiled for 5 minutes while being well stirred. After cooling, 70.4 g. (0.4 mol.) of 1-chloromethylnaphthalene are added drop-by-drop through a dropping funnel, whereafter the mixture is heated under reflux for 24 hours and extracted with benzene.

Distillation of the extract gives 105 g. of a honey-yellow viscous liquid, B.P.=202–203° C./1.5 mm. Hg. The yield is 69% (theoretical quantity 152 g.).

EXAMPLE 2

Ethyl α-(1-naphthylmethyl) α-tetrahydrofurylpropyl-malonate $C_{25}H_{32}O_5$ (M=412.51)

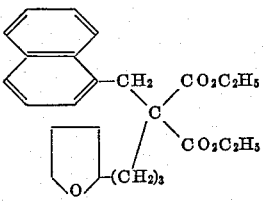

Sodium ethoxide is prepared from 4.5 g. (0.2 atom) of sodium and 128 cc. of absolute ethanol. There are added thereto 54.4 g. (0.2 mol) of ethyl tetrahydrofurylpropylmalonate. The mixture is boiled for 5 minutes and then cooled. There are then added drop-by-drop 35.2 g. (0.2 mol) of 1-chloromethylnaphthalene and the mixture is heated under reflux for 24 hours. After extraction, distillation gives 53 g. of a pale yellow viscous oil, B.P.=211° C./0.95 mm. Hg. Yield 64.7% (Theoretical quantity 82 g.).

EXAMPLE 3

Ethyl alpha-(1-naphthylmethyl) alpha-tetrahydrofurfuryl-malonate

This compound is obtained by the general process of preparation hereinbefore defined, by condensation of ethyl tetrahydrofurfurylmalonate and 1-chloromethyl-naphthalene in the presence of sodium ethoxide. The compound has a boiling point of 200° C./1 mm. Hg.

What we claim is:
1. An α-substituted carboxylic acid derivative represented by the general formula

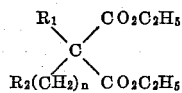

wherein $n$ is an odd number at most equal to 3, $R_1$ is the naphthyl methyl radical and $R_2$ is a member of the group consisting of the furyl and tetrahydrofuryl radicals.

2. Ethyl α-(1-naphthylmethyl) α-furfurylmalonate.
3. Ethyl α-(1-naphthylmethyl) α-tetrahydrofurylpropylmalonate.
4. Ethyl alpha-(1-naphthylmethyl) alpha-tetrahydrofurfurylmalonate.
5. Process for preparing an α-substituted carboxylic acid derivative represented by the general formula

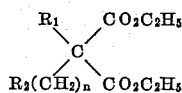

wherein $n$ is an odd number at most equal to 3, $R_1$ is the naphthyl-methyl radical and $R_2$ is a member of the group consisting of the furyl and tetrahydrofuryl radicals, which comprises reaction of sodium ethoxide with an ethyl malonate mono-substituted by the radical $R_2(CH_2)_n$, wherein $R_2$ and $n$ have the same meanings as above, followed by condensation of the sodium derivative obtained with 1-chloromethylnaphthalene.

References Cited by the Examiner

Chemical Abstracts, vol. 58, page 1435 (1963), QD 1 AS1.

NICHOLAS S. RIZZO, *Primary Examiner.*